United States Patent [19]
Tetreault et al.

[11] Patent Number: 5,997,798
[45] Date of Patent: Dec. 7, 1999

[54] BIASING MOLD FOR INTEGRATED CIRCUIT CHIP ASSEMBLY ENCAPSULATION

[75] Inventors: Real Joseph Tetreault, Granby; Joseph Georges Alain Tremblay, Richelieu, both of Canada

[73] Assignee: International Business Machines Corporation, Armonk, N.Y.

[21] Appl. No.: 08/884,483

[22] Filed: Jun. 27, 1997

[51] Int. Cl.⁶ .......................... B29C 33/64; B29C 33/76; B29C 70/70; B29C 33/10
[52] U.S. Cl. ............... 264/510; 264/272.14; 264/272.17; 264/272.15; 264/277; 264/278; 425/116; 425/544; 425/546
[58] Field of Search ..................... 264/272.14, 272.15, 264/272.17, 275, 276, 510, 277, 278; 425/116, 543, 544, 546, 577, 812

[56] References Cited

U.S. PATENT DOCUMENTS

| | | | |
|---|---|---|---|
| 3,608,023 | 9/1971 | Scarborough | 264/102 |
| 4,861,251 | 8/1989 | Moitzger | 264/272.15 |
| 4,915,607 | 4/1990 | Medders et al. | |
| 5,019,673 | 5/1991 | Juskey et al. | |
| 5,120,678 | 6/1992 | Moore et al. | |
| 5,169,056 | 12/1992 | Recle et al. | |
| 5,203,076 | 4/1993 | Banerji et al. | |
| 5,239,198 | 8/1993 | Lin et al. | |
| 5,248,710 | 9/1993 | Shiobara et al. | |
| 5,273,938 | 12/1993 | Lin et al. | |
| 5,292,688 | 3/1994 | Hsiao et al. | |
| 5,337,588 | 8/1994 | Chhatwal | 264/272.14 |
| 5,371,404 | 12/1994 | Juskey et al. | |
| 5,385,869 | 1/1995 | Liu et al. | |
| 5,409,362 | 4/1995 | Neu | 264/272.17 |
| 5,444,028 | 8/1995 | Sono et al. | 264/272.15 |
| 5,450,283 | 9/1995 | Lin et al. | |
| 5,603,879 | 2/1997 | Osada et al. | 264/272.17 |
| 5,626,887 | 5/1997 | Chou et al. | 425/544 |
| 5,662,848 | 9/1997 | Tanaka et al. | 425/546 |
| 5,665,281 | 9/1997 | Drummond | 425/812 |

FOREIGN PATENT DOCUMENTS 0 690 499 A2  1/1996  European Pat. Off. .

*Primary Examiner*—Angela Ortiz
*Attorney, Agent, or Firm*—James A. Lucas; Driggs, Lucas, Brubaker & Hogg Co., L.P.A.

[57] ABSTRACT

This invention provides an improved apparatus and method for encapsulating the solder ball interconnections of an integrated circuit assembly which accommodates the use of high viscosity encapsulating materials and enables flush molding to be accomplished without substantially altering the exposed surface of the integrated circuit chip. In accordance with the preferred embodiment of this invention, an integrated circuit chip assembly including an integrated circuit chip mounted on a chip carrier or directly on a circuit board in a standoff relationship by solder ball connections is provided. A mold is placed over the integrated circuit chip. The mold of one embodiment has a compliant material disposed on the molding surface of the mold cavity. The mold also has at least one inlet hole for dispensing encapsulant into the mold, at least one opening for applying a vacuum to the mold and at least one vent. The mold is placed so that the compliant material is flush against the exposed surface of the integrated circuit chip. External pressure is applied to the mold to seal the mold to the surface of the substrate. A metered volume of encapsulant material is dispensed through the inlet into the space surrounding the integrated circuit chip and the space between the integrated circuit chip and the chip carrier or circuit board while a vacuum is applied to the mold to facilitate flow into the mold and around the solder ball interconnections. After the required amount of encapsulant material is dispensed, the material is cured to form a bond between the integrated circuit chip and the chip carrier or circuit board and reinforce the solder ball connections. In another embodiment of the mold of this invention, a bore hole extends through the mold and into the cavity. The bore hole is fitted with a push pin and a retractable spring support which together serve as a biasing mechanism during the molding process.

9 Claims, 4 Drawing Sheets

BIASING MOLD FOR INTEGRATED CIRCUIT CHIP ASSEMBLY ENCAPSULATION

BACKGROUND OF THE INVENTION

This invention relates to an apparatus and method for encapsulating and reinforcing the electrical interconnections between an integrated circuit chip and a substrate. More specifically, this invention relates to an improved molding apparatus to encapsulate and reinforce solder joints between an integrated circuit chip and a Z substrate.

An integrated circuit chip assembly generally comprises an integrated circuit chip attached to a substrate, typically a chip carrier or a circuit board. The most commnnonly used integrated circuit chip is composed primarily of silicon having a coefficient of thermal expansion of about 2 to 4 ppm/° C. The chip carrier or circuit board is typically composed of either a ceramic material having a coefficient of thermal expansion of about 6 ppm/° C., or an organic material, possibly reinforced with organic or inorganic particles or fibers, and having a coefficient of thermal expansion in the range of about 6 to 50 ppm/° C. One technique well known in the art for attaching the chip to the substrate is flip chip bonding. In flip chip bonding, a pattern of solder balls, usually having a diameter of about 0.002 to 0.006 inches, is formed on the one surface of the integrated circuit chip, fully or partially populating the active chip surface with interconnection sites. A matching footprint of solder wettable terminals is provided on the substrate. The integrated circuit chip is then placed in alignment with the substrate, and the chip to substrate connections are formed by reflowing the solder balls. During operation of the integrated circuit chip assembly, cyclic temperature excursions cause the substrate and the integrated circuit chip to expand and contract. Since the substrate and the integrated circuit chip have different coefficients of thermal expansion, they expand and contract at different rates causing the solder ball connections to weaken or even crack as a result of fatigue. To remedy this situation, it is common industry practice to reinforce the solder ball connections with a thermally curable polymer material known in the art as an underfill encapsulant.

Underfill encapsulants are typically filled with ceramic particles to control their rheology in the uncured state, and to improve their thermal and mechanical properties in the cured state. Underfill encapsulants have been used widely to improve the fatigue life of integrated circuit chip assemblies consisting of an integrated circuit chip of the flip chip variety attached to a substrate comprised of an alumina ceramic material having a coefficient of thermal expansion of about 6 ppm/° C. More recently, integrated circuit chip assemblies have been manufactured using substrates comprised of a reinforced organic material having a composite coefficient of thermal expansion of about 20 ppm/° C.

The underfill encapsulation process is typically accomplished by dispensing a liquid encapsulant directly onto the substrate at one or more points along the periphery of the integrated circuit chip. The encapsulant is drawn into the space between the integrated circuit chip and the substrate by capillary forces, and forms a fillet around the perimeter of the integrated circuit chip. The diameter of the filler particles in the encapsulant is typically smaller than the height of the space so that flow is not restricted, with typical encapsulant formulations having viscosities of about 10 Pa-s at the dispense temperature. Once the underfilling process is completed, the encapsulant is heat cured in an oven. Cured encapsulants typically have coefficients of thermal expansion in the range of 20 to 40 ppm/° C. and a Young's Modulus of about 1 to 3 GPa, depending to a large degree on the filler content. Depending on the materials the integrated circuit chip and the substrate are composed of, it may be desirable to further alter the cured properties of the encapsulant. However, the requirement that the encapsulant have low viscosity in the uncured state so that it flows readily into the space between the integrated circuit chip and the substrate severely restricts the formulation options. For example, the addition of more ceramic filler would result in a lower coefficient of thermal expansion, but would cause an increase in the viscosity of the uncured encapsulant. Furthermore, even with the use of underfill encapsulation, fatigue life of an integrated circuit chip assembly is shorter when the integrated circuit chip is interconnected to an organic substrate as opposed to a ceramic substrate due to the greater mismatch in thermal expansion between the typical integrated circuit chip and organic substrates.

Also known in the art is a method wherein a package body is formed around the perimeter of the flip chip using a two step process. First the integrated circuit chip assembly is underfilled as described above. Next, a package body is formed around the perimeter of the integrated circuit chip using a molding process. The prior art also suggests a process, wherein additional reinforcement is achieved by forming a package body around the integrated circuit chip assembly using a single step operation. In this process, a large opening of about 50% of the size of the integrated circuit chip is formed in the substrate directly underneath the integrated circuit chip. This approach essentially eliminates the space between the integrated circuit chip and the substrate that is typical of a conventional integrated circuit chip to substrate interconnection, but has the drawback of limiting the active surface area of the integrated circuit chip that can be utilized for forming interconnections.

The prior art also suggests a molding apparatus comprised of an upper and lower mold which when joined together around an integrated circuit lead frame defines a package area. Encapsulant material flows from a reservoir into a package area forming a packing body around the integrated circuit chip lead frame.

It is an object of the present invention to provide an improved apparatus and a method of encapsulating and reinforcing the electrical interconnections of an integrated circuit chip assembly which allows the use of highly viscous encapsulating materials. It is also an object of this invention to provide a method and apparatus for encapsulating the integrated circuit chip assembly which enables flush molding without reducing the active interconnection area of the integrated circuit chip or substantially altering the exposed surface of the integrated circuit chip.

SUMMARY OF THE INVENTION

This invention provides an improved apparatus and method for encapsulating the solder ball interconnections of an integrated circuit assembly which accommodates the use of high viscosity encapsulating materials and enables flush molding to be accomplished without substantially altering the exposed surface of the integrated circuit chip. In accordance with the preferred embodiment of this invention, an integrated circuit chip assembly comprised of an integrated circuit chip mounted on a chip carrier or directly on a circuit board in a standoff relationship by solder ball connections is provided.

A mold is placed over the integrated circuit chip. The mold of one embodiment has a compliant material disposed on the molding surface of the mold cavity. The mold also has at least one inlet hole for dispensing encapsulant into the mold, at least one opening for applying a vacuum to the mold and at least one vent. The mold is placed so that the compliant material is flush against the exposed surface of the integrated circuit chip. External pressure is applied to the mold to seal the mold to the surface of the substrate to which the integrated circuit chip is attached. A metered volume of encapsulant material is dispensed through the inlet into the space surrounding the integrated circuit chip and the space between the integrated circuit chip and the chip carrier or circuit board. A vacuum is applied to the mold to facilitate flow into the mold and around the solder ball interconnections. After the required amount of encapsulant material is dispensed, the material is cured to form a bond between the integrated circuit chip and the chip carrier or circuit board and reinforce the solder ball connections.

In another embodiment of the mold of this invention, a bore hole extends through the mold and into the cavity. The bore hole is fitted with a push pin and a retractable spring support which together serve as a biasing mechanism during the molding process.

DETAILED DESCRIPTION

Figure 1:
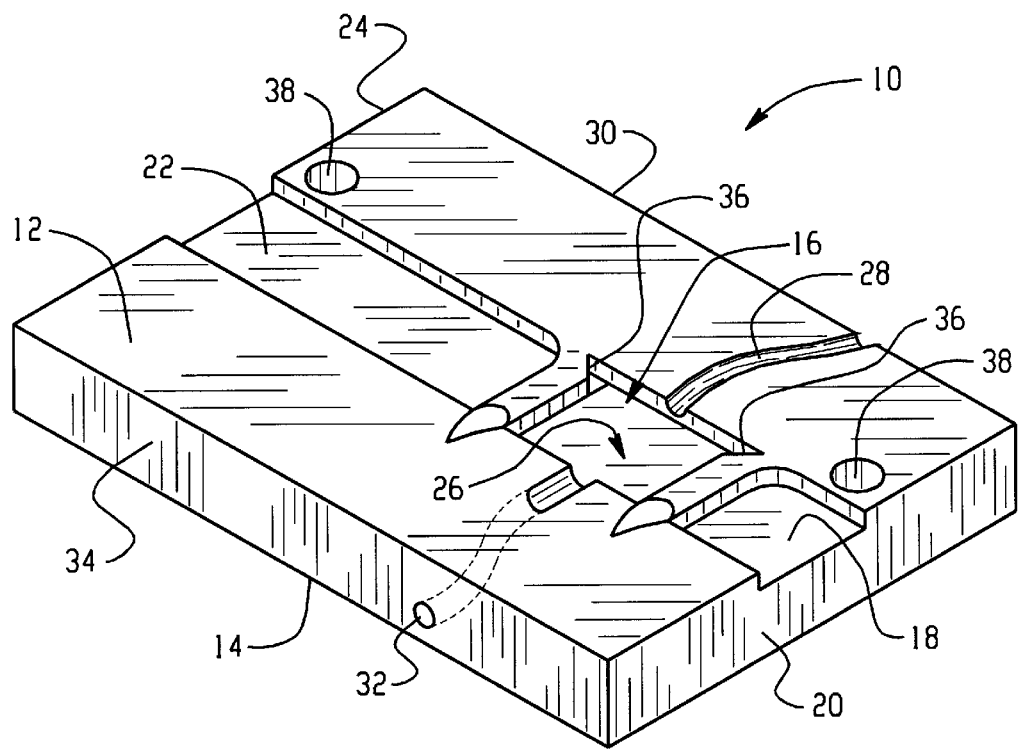
FIG. 1 is a perspective view somewhat diagrammatic of one embodiment of the mold of the present invention.
Figure 2:
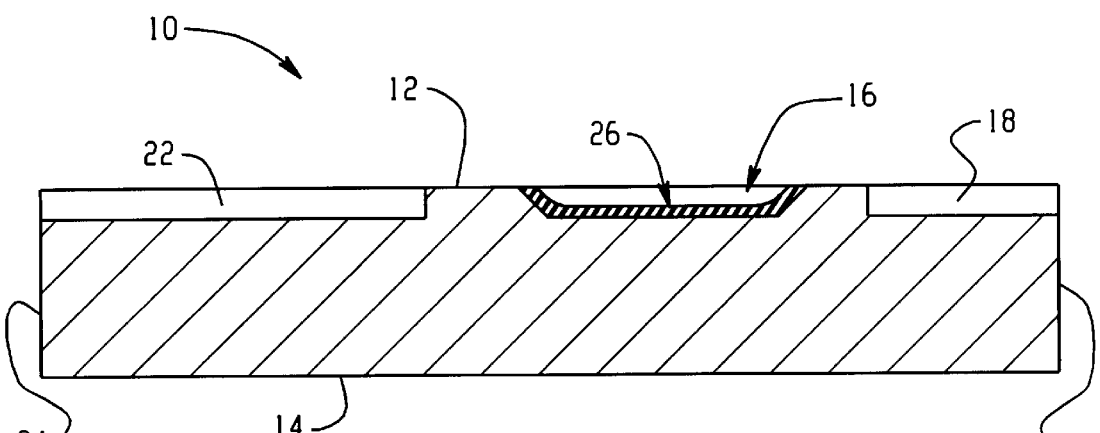
FIG. 2 is a longitudinal sectional view somewhat diagrammatic of the embodiment of FIG. 1 of the mold of the present invention.

Referring to FIGS. 1 and 2, one embodiment of the mold of the present invention is illustrated. The mold 10 comprises a molding surface 12 and a remote surface 14. The molding surface 12 has a cavity 16, a first depression 18 adjacent but spaced from the cavity 16 and extending laterally to a first edge 20, and a second depression 22 adjacent but spaced from the cavity 16 and extending laterally to a second edge 24. The cavity 16 has a compliant material 26 disposed therein. The compliant material 26 serves as a biasing mechanism during the molding process, and preferably comprises rubber or silicone. The mold 10 has a channel 28 for dispensing an encapsulant material into the cavity 16 extending from the cavity 16 to a first lateral edge 30, and a passageway 32 extending from the cavity 16 to a second lateral edge 34. The passageway 32 is used for the application of a vacuum to the cavity 16. The mold 10 has at least one vent 36 extending from the cavity 16. The mold 10 may also have at least one borehole 38 for mounting the mold 10 to a piston. In the preferred embodiment, the mold 10 is preferably made of metal, such as steel.

Figure 5:
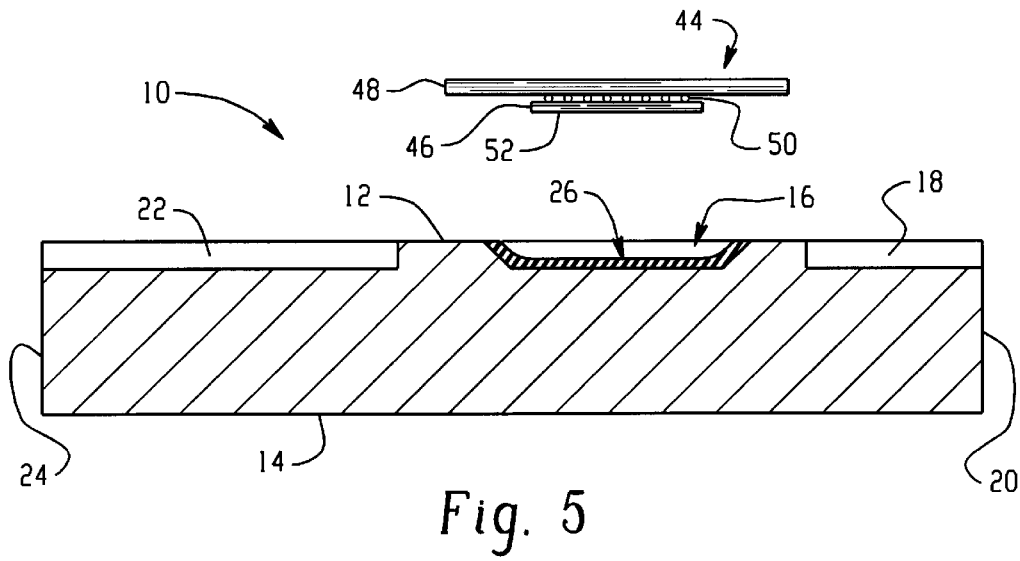
FIG. 5 is a longitudinal sectional view of an integrated circuit chip assembly positioned for encapsulation according to one embodiment of the present invention.
Figure 7:
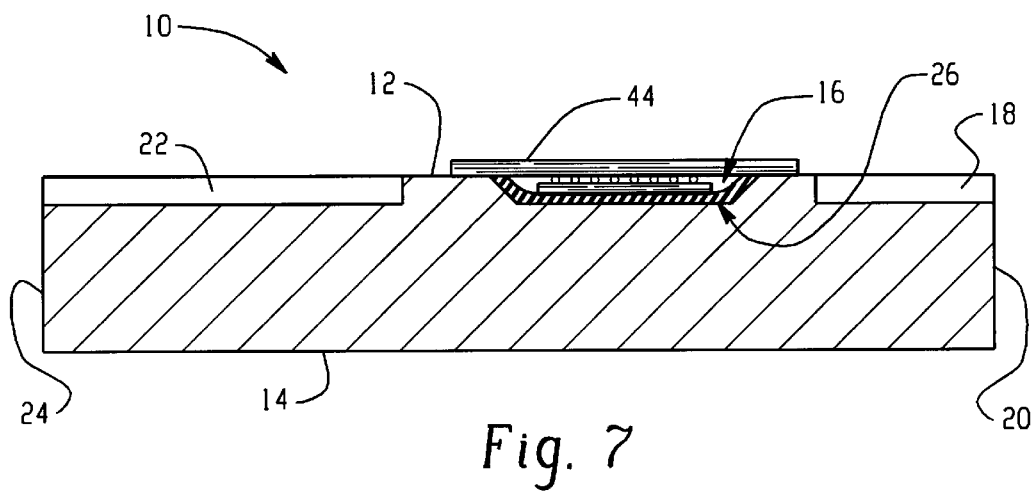
FIG. 7 is a longitudinal sectional view of an integrated circuit chip assembly covered by one embodiment of the mold of the present invention positioned for encapsulation according to the method of the present invention.

A shown in FIGS. 5 and 7, the mold 10 is placed over an integrated circuit chip assembly 44 comprised of an integrated circuit chip 46 attached to a chipcarrier 48 with solder balls 50. The mold 10 rests on the chipcarrier 48. As shown in FIG. 7, the compliant material 26 fits against the exposed surface 52 of the integrated circuit chip 46, and serves as a biasing means, accommodating for tilting of the integrated circuit chip 46 during positioning of the mold 10. A shown in FIG. 8, when the substrate 48 comprises a circuit board 54 having a plurality of integrated circuit chips 56, 57 and 58 attached to an attachment surface 59 of the circuit board 54, the first depression 18 and the second depression 22 are arranged so that integrated circuit chips 56 and 58, adjacent to integrated circuit chip 57, are not damaged or altered while integrated circuit chip 57 is being encapsulated. As such, it is preferable that the first depression 18 and the second depression 22 each have a height at least equal to the distance between the attachment surface 59 of the circuit board 54 and the exposed surfaces 60 of integrated circuit chips 56 and 58. A conventional backing plate not shown may be used to support and locate the mold and circuit board.

Figure 8:
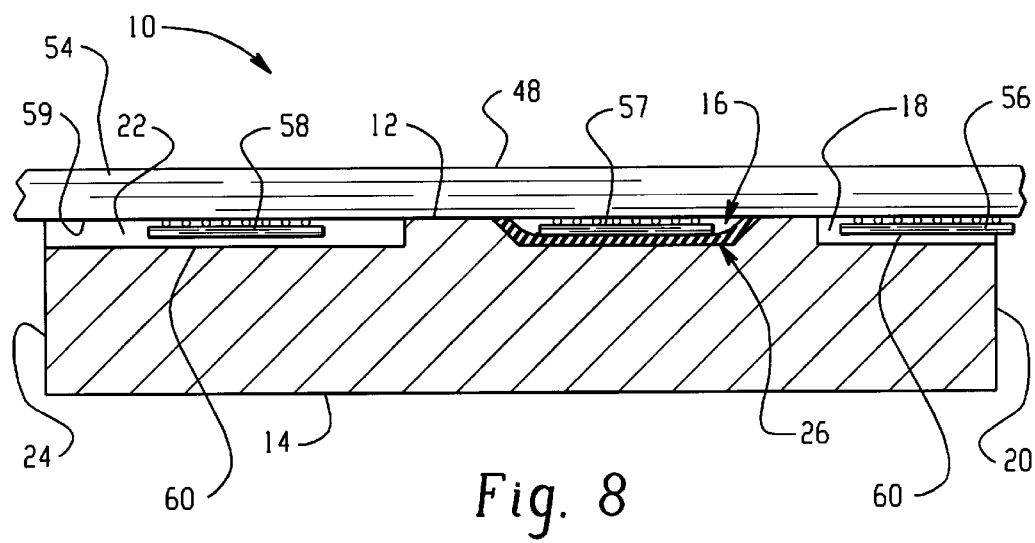
FIG. 8 is a longitudinal sectional view of an integrated circuit chip assembly comprised of a plurality of integrated circuit chips attached to a circuit board covered by one embodiment of the mold of the present invention positioned for encapsulation according to the method of the present invention.

Referring again to FIGS. 1 and 3, an encapsulant material (not shown) is dispensed through channel 28 into cavity 16. A vacuum is applied at passageway 32 to help facilitate flow of the encapsulant material into the cavity 16 and around the solder balls 50. The mold 10 is then removed. If the substrate is a circuit board as shown in FIG. 8, the mold 10 is then placed over integrated circuit chip 56 or 58 and the encapsulation/molding procedure is repeated. After the desired number of integrated circuit chip assemblies are encapsulated, the encapsulant material is cured, forming a bond between the integrated circuit chips 56, 57 and 58, and the circuit board 54 and reinforcing the electrical interconnections therebetween.

Figure 3:
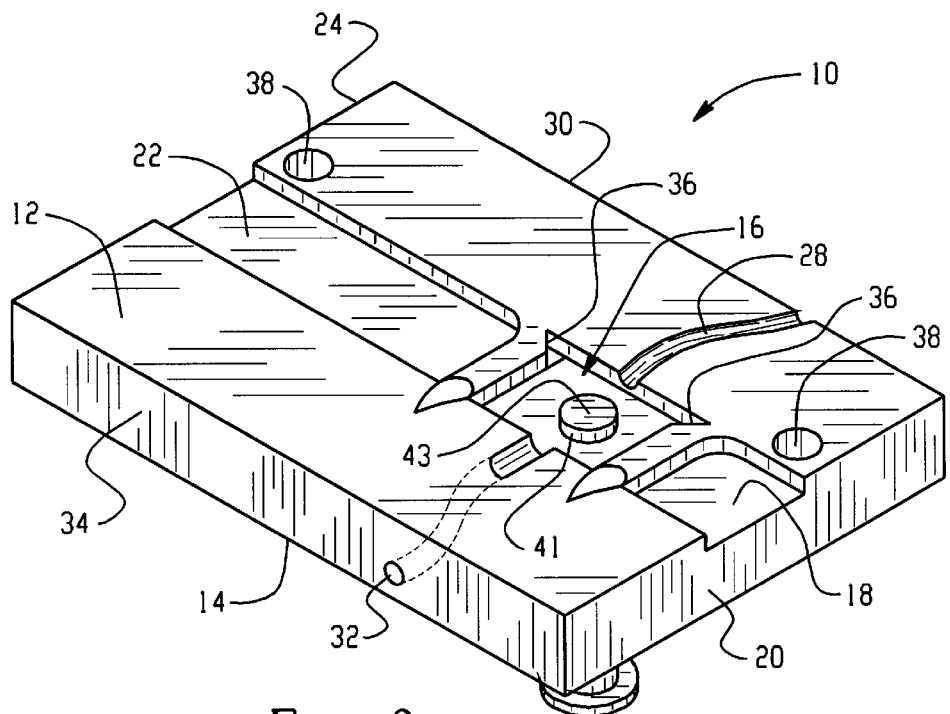
FIG. 3 is a perspective view somewhat diagrammatic of another embodiment of the mold of the present invention.
Figure 4:
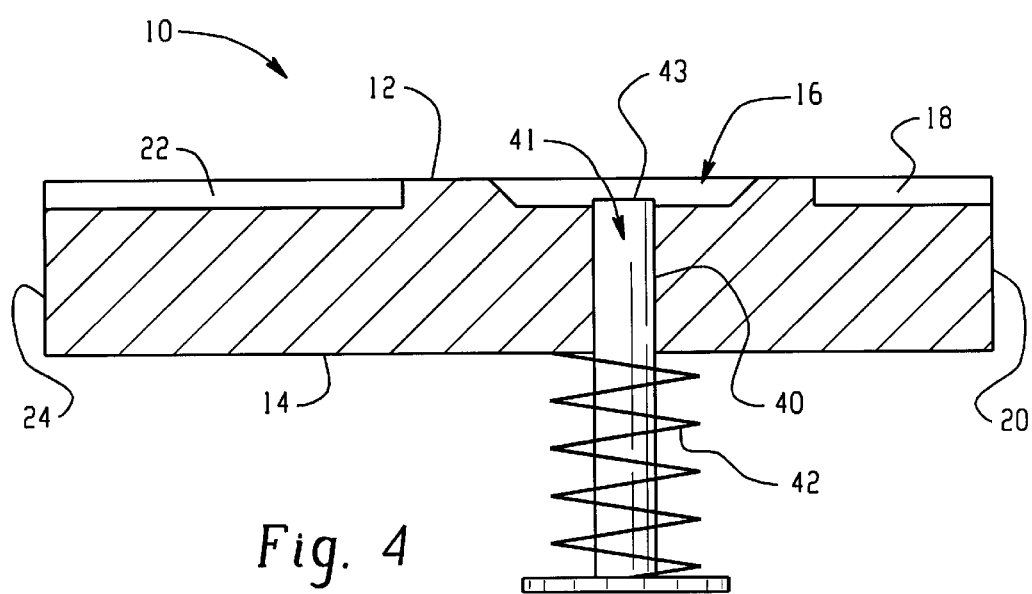
FIG. 4 is a longitudinal sectional view somewhat diagrammatic of one embodiment of FIG. 3 of the mold of the present invention.

In another embodiment of the present invention, as illustrated in FIGS. 3 and 4, the mold 10 has a borehole 40 extending from the cavity 16 to the remote surface 14. The borehole 38 is fitted with a push pin 41 and a retractable spring support 42. The push pin 41 and retractable spring support 40 serve as a biasing mechanism during the molding process. The push pin 41 having a blunt end 43 and is driven by an eccentric rod (not shown) which is activated by a rotary cylinder. When the mold 10 is placed over the integrated circuit chip 46, the rotary cylinder 66 is activated by compressed air and causes the eccentric rod 64 to rotate. The rotation of the eccentric rod 64 causes the push pin 41 to rotate and move further into the bore hole 40. The rotation of the push pin 41 causes the retractable spring support 42 to compress and forces the mold 10 to move until the exposed surface 60 of the integrated circuit chip 46 comes in contact with the cavity 16. The push pin 41 continues to rotate further into the bore hole 40 until it touches the exposed surface 60 of the integrated circuit chip 46.

Figure 6:
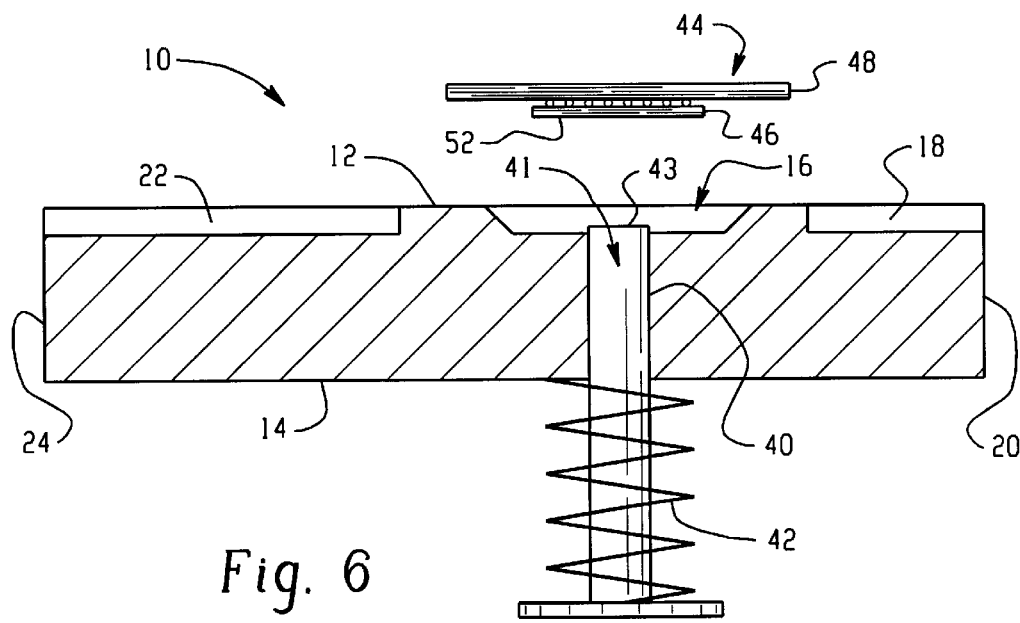
FIG. 6 is a longitudinal sectional view of an integrated circuit chip assembly positioned for encapsulation according to another embodiment of the present invention.

As in the previously described embodiment and referring to FIGS. 3 and 6 an encapsulant material is dispensed through channel 28 into cavity 16. A vacuum is applied at passageway 32 to help facilitate flow of the encapsulant material into the cavity 16 and around the solder balls 50. The mold 10 is then removed. If the substrate is a circuit board as shown in FIG. 8, the mold 10 is then placed over integrated circuit chip 56 or 58 and the encapsulation/molding procedure is repeated. After the desired number of integrated circuit chip assemblies are encapsulated, the encapsulant material is cured, forming a bond between the integrated circuit chips 56, 57 and 58, and the circuit board 54 and reinforcing the electrical interconnections therebetween.

Accordingly, the preferred embodiment of the present invention has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

What is claimed is:

1. A mold for encapsulating the solder ball interconnections of integrated circuit chip assemblies comprising:
    a molding surface and a remote surface;
    a first edge perpendicular to said molding surface opposing a second edge;
    a third edge perpendicular to said molding surface opposing a fourth edge;
    a cavity in said molding surface adapted for placement over an integrated circuit chip, said cavity having a compliant material disposed therein serving as an integrated circuit chip positioning member;
    a first depression adjacent and spaced from said cavity extending laterally to said first edge for receiving an integrated circuit chip adjacent to the integrated circuit chip with the solder ball interconnects to be encapsulated;
    a second depression adjacent and spaced from said cavity extending laterally to said second edge for receiving another integrated circuit chip adjacent to the integrated circuit chip with the solder ball interconnects to be encapsulated;
    at least one channel extending through said mold to said cavity for dispensing an encapsulant material into said cavity;
    at least one passageway extending from said cavity through said mold for applying a vacuum to said cavity to facilitate the flow of an encapsulant material into the cavity; and
    at least one vent extending from said cavity.

2. The mold of claim 1 wherein said compliant material comprises rubber or silicone.

3. A mold for encapsulating integrated circuit chip assemblies, comprising:
    a molding surface and a remote surface;
    a first edge perpendicular to said molding surface opposing a second edge;
    a third edge perpendicular to said molding surface opposing a fourth edge;
    a cavity in said molding surface adapted for placement over an integrated circuit chip, said cavity having a bore hole extending from an inner surface of said cavity to said remote surface of said mold;
    a biasing member in said bore hole extending through said bore hole from said remote surface of said mold into said cavity for positioning an integrated circuit chip in the cavity for encapsulation;
    a first depression adjacent and spaced from said cavity extending laterally to said first edge for receiving an integrated circuit chip adjacent to the integrated circuit chip to be encapsulated;
    at least one second depression spaced from and adjacent said cavity extending laterally to said second edge for receiving another integrated circuit chip adjacent to the integrated circuit chip to be encapsulated;
    at least one channel in said mold extending through said mold from said cavity for dispensing an encapsulant material into said cavity;
    at least one passageway extending from said cavity through said mold for applying a vacuum to said cavity to facilitate the flow of the encapsulant material into the cavity; and
    at least one vent extending from said cavity.

4. The mold of claim 3 wherein said biasing member comprises:
    a push pin having a head, a shaft and a blunt end, fitted with a retractable spring support, said push pin extending through said borehole so that said blunt end extends into said cavity;
    a rotatable rod eccentric to and resting against said head to drive said push pin; and
    means for activating said rod.

5. The mold of claim 4 wherein said activating means comprises a rotary cylinder.

6. A method for encapsulating and reinforcing the solder ball interconnections of an integrated circuit chip assembly, comprising the steps of
    providing a substrate having a remote surface and a mounting surface and an integrated circuit chip having an attachment surface and a remote surface; said attachment surface of said integrated circuit chip being attached using a plurality of solder balls to said mounting surface of said substrate in a standoff relationship thereby defining a space therebetween;
    providing a mold, said mold comprising a molding surface and a remote surface; a first edge perpendicular to said molding surface opposing a second edge; a third edge perpendicular to said molding surface opposing a fourth edge; a cavity in said molding surface adapted for placement over an integrated circuit chip, said cavity having a compliant material disposed therein serving as an integrated chip positioning member; a first depression adjacent and spaced from said cavity extending laterally to said first edge; a second depression adjacent and spaced from said cavity extending laterally to said second edge; the first and second depressions adapted to receive integrated circuit chips adjacent to the integrated circuit chip with the solder ball interconnections being encapsulated; at least one channel extending through said mold to said cavity for dispensing an encapsulant material into said cavity; at least one passageway extending from said cavity through said mold for applying a vacuum to said cavity; and at least one vent extending from said cavity;
    placing said mold over said integrated circuit chip so that compliant material rests flush against said remote surface of said integrated circuit chip;
    applying pressure to said outer surface of said mold to seal said mold to said mounting surface of said substrate;
    applying a vacuum to at least one of said passageways to facilitate the flow of the encapsulant material into the cavity;
    dispensing a volume of an encapsulant through at least one of said channels into said cavity so that said encapsulant at least substantially fills said space; and curing said encapsulant to form a bond between said substrate and said integrated circuit chip.

7. A method for encapsulating and reinforcing the solder ball interconnections of an integrated circuit chip assembly, comprising the steps of providing a substrate having a remote surface and a mounting surface and an integrated circuit chip having an attachment surface and a remote surface; said attachment surface of said integrated circuit chip being attached using a plurality of solder balls to said mounting surface of said substrate in a standoff relationship thereby defining a space there between;

providing a mold, said mold comprising a molding surface and a remote surface; a first edge perpendicular to said molding surface opposing a second edge; a third edge perpendicular to said molding surface opposing a fourth edge; a cavity in said molding surface adapted for placement over an integrated circuit chip, said cavity having a bore hole extending from an inner surface of said cavity to said remote surface of said mold, a biasing member in said bore hole extending through said bore hole from said remote surface of said mold into said cavity; said biasing member comprising: a push pin having a head, a shaft and a blunt end, fitted with a retractable spring support, said push pin extending through said borehole so that said blunt end extends into said cavity to position the integrated circuit chip in the cavity; a rotatable rod eccentric to and resting against said bead to drive said push pin; and means for activating said rod, a first depression adjacent and spaced from said cavity extending laterally to said first edge; a second depression adjacent and spaced from said cavity extending laterally to said second edge; said first and second depressions adapted to receive integrated circuit chips adjacent to the integrated circuit chip with the solder ball interconnection being encapsulated; at least one channel in said mold extending through said mold from said cavity for dispensing an encapsulant material into said cavity; and at least one passageway extending from said cavity through said mold for applying a vacuum to said cavity; and at least one vent extending from said cavity;

placing said mold over said integrated circuit chip so that said cavity covers said integrated circuit chip;

activating said rod so that said biasing member causes said mold to move until said cavity rests flush against said remote surface of said integrated circuit chip;

applying pressure to said outer surface of said mold to seal said mold to said mounting surface of said substrate;

applying a vacuum to at least one of said passageways to facilitate the flow of the encapsulant material into the cavity;

dispensing a volume of an encapsulant through at least one of said channels into said cavity so that said encapsulant at least substantially fills said space; and curing said encapsulant to form a bond between said substrate and said integrated circuit chip.

8. The process of claim 6, wherein said compliant material comprises rubber or silicone.

9. The process of claim 7 wherein said activating means comprises a rotary cylinder.

* * * * *